(12) United States Patent
Koyama et al.

(10) Patent No.: US 6,533,440 B2
(45) Date of Patent: Mar. 18, 2003

(54) LIGHT REFLECTOR

(75) Inventors: Hiroshi Koyama, Ibaraki (JP); Tomotsugu Takahashi, Tokyo (JP)

(73) Assignee: Yupo Corporation, Tokyo (JP)

( * ) Notice: Subject to any disclaimer, the term of this patent is extended or adjusted under 35 U.S.C. 154(b) by 0 days.

(21) Appl. No.: 09/841,608

(22) Filed: Apr. 25, 2001

(65) Prior Publication Data

US 2002/0015299 A1 Feb. 7, 2002

(30) Foreign Application Priority Data

Apr. 26, 2000 (JP) ........................... 2000-126060

(51) Int. Cl.⁷ .................................................. F21V 7/22
(52) U.S. Cl. ........................................ 362/296; 362/341
(58) Field of Search .................... 362/31, 296, 327, 362/341

(56) References Cited

U.S. PATENT DOCUMENTS

| | | | | |
|---|---|---|---|---|
| 5,683,802 A | * | 11/1997 | Murschall et al. | 428/325 |
| 5,710,856 A | * | 1/1998 | Ishii et al. | 385/146 |
| 5,800,909 A | * | 9/1998 | Nitta et al. | 428/207 |
| 6,251,505 B1 | * | 6/2001 | Rakos et al. | 428/212 |

* cited by examiner

Primary Examiner—Alan Cariaso
(74) Attorney, Agent, or Firm—Oblon, Spivak, McClelland, Maier & Neustadt, P.C.

(57) ABSTRACT

A light reflector comprising a biaxially stretched film containing a polyolefinic resin and a filler, wherein said filler is an inorganic filler having an average grain size of 0.1 to 8 μm and/or an organic filler having a mean dispersion grain size of 0.1 to 8 μm, and said biaxially stretched film has an area stretched factor of 16 to 80, and having a luminance of 1,200 cd/m² or above is disclosed. A specific feature of such light reflector of the present invention resides in that improvement in the luminance achieved at low cost is ascribable to the structural feature thereof rather than to the composition.

7 Claims, 1 Drawing Sheet

LIGHT REFLECTOR

TECHNICAL FIELD

The present invention relates to a light reflector, and in more detail, a light reflector for reflecting light from a light source to thereby achieve a high luminance.

BACKGROUND ART

Backlight type liquid crystal displays provided with built-in light sources have a wide market. As one example of such backlight type displays, a typical constitution of a side-light type display unit is shown in FIG. 1. The unit has a light-guide plate comprising a transparent acryl plate 3 having on one surface thereof a dot-printed plane 2, a light reflector 1 placed opposing to the dot-printed plane 2, a diffusing plate 4 placed opposing to the opposite plane of the light-guide plate, and a cold cathode lamp 5 placed in the lateral vicinity of the light-guide plate. In such constitution, light introduced into the light-guide plate from the lateral side thereof causes light emission at the dot-printed plane 2, to thereby prevent reflection or leakage of the light, which allows the diffusing plate 4 to produce a uniform surface emission of the light.

In such backlight unit, the light reflector functions so as to make an effective use of the light from the light source for display, and thus allows the displays to be adapted to the individual purposes. Since glaring mirror reflection is not preferred in general for the display, and instead it is necessary to provide by scattering reflection a relatively uniform surface luminance to thereby create a natural sight for the user. In particular for the light reflector for use in a liquid crystal display of the side-light type, it is necessary to uniformly reflect the light which otherwise tends to leak backward through the light-guide plate.

It is known from the past to add a white pigment such as titanium oxide or fluorescent brightener to a film composing the light reflector in order to raise the luminance thereof. It is also known to coat a white pigment such as titanium oxide on a metal plate such as aluminum plate to prevent the light transmission and mirror reflection.

As is described in the above, the conventional light reflector has been controlled in the optical functions thereof, such as luminance, through the use of components having optical properties. The present invention, however, shifts a point of view from such use of the optically functional material to the employment of a specific structure of the light reflector per se, to thereby improve the luminance at low cost.

SUMMARY OF THE INVENTION

The present inventors got an idea that, when the light introduced from the lateral side of the light-guide plate is refracted or reflected by the light reflector, a highly efficient reflection will be ensured and thus the luminance can be improved if the light reflector has a number of micro-lenses aligned so as to cover the entire surface thereof, where each micro-lens has an approximately exact circular profile. The present inventors found out that the foregoing problem can be solved at low cost if the function of such micro-lenses are assigned to voids produced in a stretched film, and that a light reflector having a luminance of 1,200 cd/m² or above can uniformly reflect the light, which otherwise leaks backward through the light guide plate, to thereby achieve surface emission, which led them to complete the present invention.

That is, the present invention is to provide a light reflector comprising a biaxially stretched film containing a polyolefinic resin and a filler, wherein said filler is an inorganic filler having an average grain size of 0.1 to 8 μm and/or an organic filler having a mean dispersion grain size of 0.1 to 8 μm, said biaxially stretched film has an area stretched factor of 16 to 80, and said light reflector has a luminance of 1,200 cd/m² or above.

A volume ratio of the filler to the biaxially stretched film is preferably 3.0 to 35% by volume, and for the case the inorganic filler is used, such inorganic filler preferably comprises calcium carbonate grains having a specific surface area of 20,000 cm²/g or above and excluding those with a grain size of 10 μm or above. A ratio $L_{MD}/L_{CD}$, which is a ratio of stretching factor of said biaxially stretched film in the moving direction $L_{MD}$ to a stretching factor in the crossing direction $L_{CD}$, is preferably 0.25 to 2.7. The porosity is preferably 15 to 60%, the opacity measured according to JIS (Japanese Industrial Standard) P-8138 is preferably 90% or above. The biaxially stretched film preferably has a multi-layered structure, and may have protective films on the front and/or back surface thereof.

It should now be noted that numerical ranges expressed with "to" in this specification include both end values given before and after "to" as minimum and maximum values, respectively.

BRIEF DESCRIPTION OF THE DRAWINGS

The above and other objects and features of the invention are apparent to those skilled in the art from the following referred embodiments thereof when considered in conjunction with the accompanied drawing, in which.

DETAILED DESCRIPTION OF THE INVENTION

Figure 1:
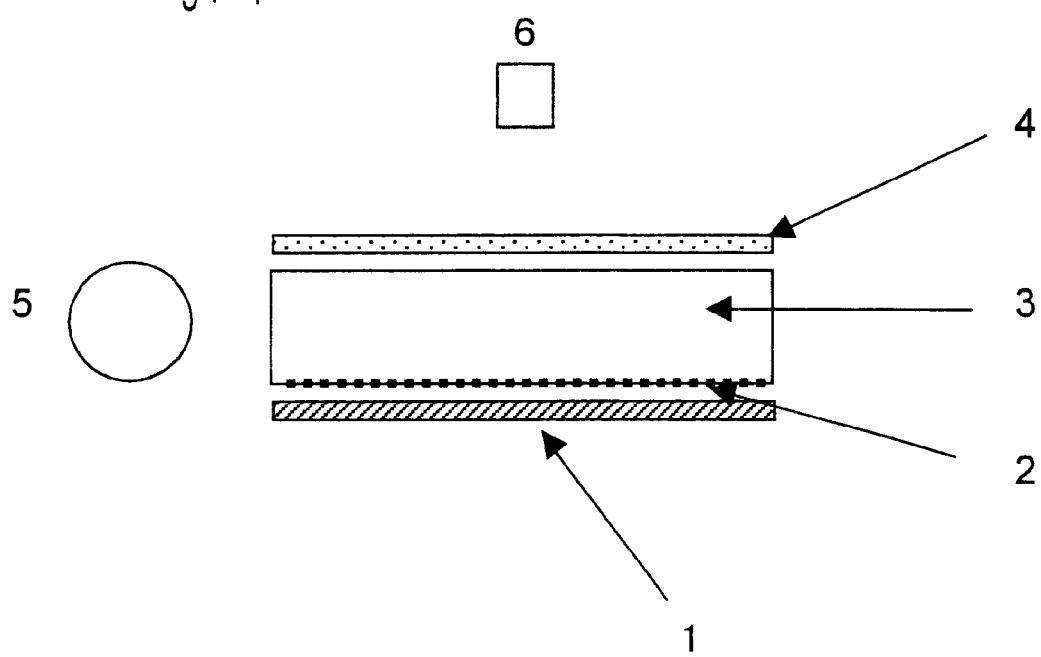
FIG. 1 is a schematic sectional view for explaining a method for measuring luminance, where reference numeral 1 is for a light reflector, 2 for a white dot printed plane for reflection, 3 for an acryl plate (light-guiding plate), 4 for a diffusion sheet, 5 for a cold cathode lamp, and 6 for a luminance gauge.

The light reflector of the present invention comprises a biaxially stretched film containing a polyolefinic resin and a filler, and features reside in that the filler is an inorganic filler having an average grain size of 0.1 to 8 μm and/or an organic filler having a mean dispersion grain size of 0.1 to 8 μm; that the biaxially stretched film has an area stretched factor of 16 to 80; ant that the light reflector has a luminance of 1,200 cd/m² or above. Using a light reflector satisfying these conditions can improve the luminance at low cost and provide a bright backlight.

Constitution and effects of the light reflector according to the present invention will be detailed hereinafter.

Polyolefinic Resin

There is no specific limitation on the polyolefinic resin used for the light reflector of the present invention, and examples of which include ethylene-base resins such as high-density polyethylene and middle-density polyethylene; and propylene-base resins. Two or more of those selected from the above resins may be used in combination. Among the polyolefinic resin, propylene-base resin is particularly preferable in view of chemical resistance and cost.

Examples of available propylene-base resin include propylene homopolymer, and copolymers of propylene as a major component with α-olefins such as ethylene, 1-butene, 1-hexene, 1-heptene and 4-methyl-1-pentene. The stereoregularity of the resin is of no specific limitation, where isotactic, syndiotactic and any other stereoregularity to a variety of degrees are allowable. The copolymer may be of binary system, ternary system or quaternary system, and may be a random copolymer or block copolymer.

Such polyolefinic resin is preferably contained in the biaxially stretched film in an amount of 38 to 91.5 wt %, more preferably 44 to 89 wt %, and still more preferably 50 to 86 wt %.

Filler

The filler available in the present invention together with the polyolefinic resin include various types of inorganic and organic fillers.

The inorganic filler can be exemplified as calcium carbonate, fired clay, silica, diatom earth, talc, titanium oxide, barium sulfate and aluminum sulfate.

The organic filler may be made of a material having a melting point (e.g., 170 to 300° C.) or a glass transition point (e.g., 170 to 280° C.) higher than those of the polyolefinic resin, examples of such materials include 6-nylon, 6,6-nylon, cycloolefinic polymer and copolymer of cycloolefin with ethylene.

A single filler may be selected for use in the biaxially stretched film from the above inorganic or organic fillers, or two or more fillers may be selected for combined use. For such combined use, it is also allowable to mix the inorganic and organic fillers.

For the purpose of regulating the size of voids produced by the stretching described later, the average grain size of the foregoing inorganic filler or the mean dispersion grain size of the organic filler is preferably 0.1 to 8 μm, respectively. The average grain size or the mean dispersion grain size exceeding the above range will result in non-uniform voids, and those lower than the above range will fail in obtaining desired voids.

All of "average grain size of the inorganic filler" mentioned in this specification refer to those calculated from the equation below:

$$\text{average grain size (μm)} = \frac{6}{\text{true specific gravity} \times \text{specific surface area}}$$

where, the specific surface area is measured using a measuring instrument (Model SS-100, product of Shimadzu Corporation), and the true specific gravity means the specific gravity of the inorganic filler in a state containing no air.

All of "mean dispersion grain size of the organic filler" mentioned in this specification are obtained by electron microscopic observation of section of the film. More specifically, the values were obtained by embedding the multi-layered stretched resin film in an epoxy resin to be solidified, slicing the resultant solid using a microtome in a direction parallel to the thickness and normal to the major plane of the film, metallizing the cut plane of the slice and observing the embedded porous resin film under a scanning electron microscope at an arbitrary magnification convenient for the observation (e.g., 500× to 2,000×).

In order to produce desirable voids, it is effective to use an inorganic filler having a specific surface area of 20,000 cm²/g or above, and excluding grains with a grain size of 10 μm or above (measured using Microtrack, a laser diffraction particle analyzer). In particular, using calcium carbonate grains having such sharp grain size distribution as defined above is preferable.

In order to regulate the amount of voids to be produced by the stretching described later, the amount of compounding the above fillers into the biaxially stretched film is preferably selected in a range from 3.0 to 35% by volume, and more preferably from 4.0 to 30% by volume. The amount of compounding of the filler lower than the above range tends to make it difficult to obtain a sufficient quantity of voids, and, exceeding the above range tends to cause wrinkle by folding due to a poor rigidity.

The biaxially stretched film used in the present invention may be of a mono-layered structure or multi-layered structure, where more preferable is the latter since it allows a broader choice of blend composition at the time of film forming. For the case that the multi-layered structure is a three-layered structure of surface layer/base layer/back layer, and that the base layer contains a propylene-base resin as a major resin, the stretching property of such layer is preferably improved by adding 3 to 25 wt % of a resin, such as polyethylene or ethylene-vinyl acetate copolymer, having a melting point lower than that of the propylene-base resin. The base layer may be added with titanium dioxide as an inorganic filler in an amount of 0.5 to 10 wt %, and more preferably 0.5 to 8.5 wt %. The surface layer and the back layer may be added with titanium dioxide as an inorganic filler in an amount less than 1 wt %, and more preferably 0.1 to 0.9 wt %. The amount of titanium dioxide exceeding the upper limit of the amount of compounding will ruin the whiteness to thereby degrade the luminance, so that the color tone and the contrast in displayed image on the liquid crystal display device tend to become unclear.

The thicknesses of the surface layer and the back layer are preferably 0.1 μm or above, more specifically 0.1 μm or above and less than 1.5 μm, which is preferably less than 15%, more preferably 1 to 10%, and still more preferably 1 to 5%, of the total thickness of the light reflector.

Additives

The biaxially stretched film used for the light reflector of the present invention may optionally be blended with a fluorescent brightener, stabilizer, photo-stabilizer, dispersion aid or lubricant. The stabilizer may be 0.001 to 1 wt % of steric-hindrance phenols, phosphorus-containing compounds or amine-base compounds; the photo-stabilizer may be 0.001 to 1 wt % of steric-hindrance amine-base compounds, benzotriazole-base compounds or benzophenone-base compounds; the dispersion aid for the inorganic filler may be 0.01 to 4 wt % of silane coupling agent, higher aliphatic acids such as oleic acid and stearic acid, metal soap, and polyacrylic acid and polymethacrylic acid or salts thereof.

Forming

The compound containing the polyolefin-base resin and the filler can be formed by the general biaxial stretching process. In a typical biaxial stretching process, the molten resin is extruded in a sheet form using a single-layered or multi-layered T-die or I-die connected to a screw extruder, the obtained sheet is then stretched in the moving direction, which is effected by difference between peripheral speeds of roll groups, and stretching in the crossing direction using a tenter oven, where simultaneous biaxial stretching is possible if the tenter oven is combined with a linear motor.

The stretching temperature is preferably lower by 2 to 60° C. than the melting point of the polyolefinic resin to be employed, and it is typically selected within a range from 152 to 164° C. for the case a propylene homopolymer (m.p. 155–167° C.) is used, and within a range from 110 to 120° C. for high-density polyethylene (m.p. 121–134° C.). The stretching speed is preferably 20 to 350 m/min.

In order to regulate the size of the voids to be produced within the biaxially stretched film, the area stretched factor, which is expressed as (stretching factor in the moving direction $L_{MD}$)×(stretching factor in the crossing direction $L_{CD}$), is preferably within a range from 16 to 80, and more preferably 25 to 70.

In order to regulate the aspect ratio of the voids produced within the biaxially stretched film, a ratio $L_{MD}/L_{CD}$, which is a ratio of stretching factor in the moving direction $L_{MD}$ to a stretching factor in the crossing direction $L_{CD}$, is preferably selected within a range from 0.25 to 2.7, and more preferably from 0.35 to 2.3.

The area stretching factor and the $L_{MD}/L_{CD}$ out of the above ranges tend to make it difficult to obtain micro-voids having a shape of approximately exact circle.

In order to regulate the quantity per unit volume of the voids produced within the biaxially stretched film, the porosity is preferably selected within a range from 15 to 60%, and more preferably from 20 to 55%.

The "porosity" in the context of this specification means a value calculated from the equation (1) shown below, in which $\rho_0$ is the true density, and $\rho$ is the density of said biaxially stretched film, calculated according to JIS P-8118.

The true density is approximately equal to pre-stretching density unless otherwise the pre-stretching material contains a large volume of air.

The biaxially stretched film for use in the present invention has a density generally within a range from 0.55 to 1.20 g/cm³, where the density becomes lower and the porosity becomes larger as the amount of the voids increases. A larger porosity desirably improves the reflective characteristics of the surface.

$$\text{porosity (\%)} = \frac{\rho_0 - \rho}{\rho_0} \times 100$$

The post-stretching thickness of the biaxially stretched film is preferably 50 to 400 μm, and more preferably 80 to 300 μm. The thickness smaller than the above range tends to promote backward leakage of the light, and the thickness exceeding the above range undesirably increases the thickness of the backlight unit.

The opacity (JIS P-8138) in the context of the present invention is preferably 90% or above, and more preferably 95% or above. The opacity less than 90% tends to promote backward leakage of the light.

Protective Layer

While the obtained biaxially stretched film can be available as the light reflector of the present invention without further processing, it is also allowable to provide a protective layer on the front surface and/or back surface of the film insofar as it does not ruin optical properties thereof, to thereby protect the film from scratches or foul possibly occur during the fabrication, processing or usage. The protective film can be provided on either side or both sides of the biaxially stretched film.

Method for forming the protective layer include such that co-extruding molten materials of the film and the protective layer using a multi-layered T-die or I-die, and biaxially stretching the obtained stack; such that stretching the film in either direction, extruding thereon a molten material of the protective layer, and stretching the obtained stack in the other direction; and such that biaxially stretching the film, directly or indirectly coating thereon a paint material of the protective layer, and then drying or curing the obtained paint film.

The same polyolefin-base resin and filler with those for the light reflector are available for the protective layer also for the case that the protective layer is stretched together with the film in either direction or both directions. The foregoing additives are also available.

The protective layer formed by post-stretching coating is typically made of a silicone-base material or fluorine-containing material. Such protective layer formed by coating may further be provided on the protective layer formed by stretching together with the film.

The coating may be performed using a roll coater, blade coater, bar coater, air knife coater, size press coater, gravure coater, reverse coater, die coater, lip coater, spray coater or so. The coating is optionally followed by smoothing, drying for removing excessive water or hydrophilic solvent, or curing with the aid of heat, light or electron beam.

The thickness of the protective layer for the light reflector is preferably selected within a range from 0.2 to 80 μm per one side, and more preferably from 2 to 60 μm, so as not to ruin optical properties of the biaxially stretched film.

It is also allowable to provide on at least one side of the protective layer an anchor coat layer and a metallized film stacked in this order to prevent the backward light leakage. This is generally accomplished by coating a polyester-base or polyurethane-base anchor coating material on the protective layer in a dry weight of 0.03 to 5 g/m², and then vapor-depositing a metal to form the metallized film.

Aluminum is a most general material for use in the vapor deposition, where the thickness of the metallized film is preferably 0.025 to 0.5 μm, and more preferably 0.03 to 0.1 μm.

Light Reflector

Shapes of the light reflector of the present invention are not specifically be limited, and can properly be selected depending on the purpose or style of use. While the light reflector is generally used in a form of plate or film, those having any other forms will be included in the scope of the present invention insofar that they are used as the light reflectors.

The light reflector of the present invention is quite valuable as that composing a display device of the backlight type, in particular of side light type. In a liquid crystal display device based on the side light type using such light reflector of the present invention, the light can uniformly be reflected by such light reflector to thereby achieve surface emission, and to thereby create a natural sight for the user.

The light reflector of the present invention is not only applicable to such liquid crystal display device of the backlight type, but also to a device of power-saving type which is designed to reflect room light without using a built-in light source.

The present invention will now be detailed referring to specific Examples, Comparative Examples and Test Examples. Materials, amount of use thereof, ratio of use, operations or the like can properly be modified without departing from the spirit of the present invention. Thus it is to be understood that the present invention is by no means limited to the specific Examples explained below.

EXAMPLES 1 TO 4, COMPARATIVE EXAMPLES 1 AND 2

A composition (A) containing a propylene homopolymer, a high-density polyethylene and a heavy calcium carbonate in the amounts listed in Table 1, and a composition (B) containing a propylene homopolymer and a heavy calcium carbonate in the amounts listed in Table 1 were separately kneaded at 250° C. under fusion using three units of extrusion machine, where two units for the composition (B). The fused materials were then sent to a single co-extrusion die, stacked within such die so that the composition (B) is stacked on both sides of the composition (A), extruded into a sheet form, and then cooled to approx. 60° C. to thereby obtain a stack.

The stack is re-heated to 145° C., and stretched at a magnification listed in Table 1 in the moving direction effected by difference in the peripheral speeds of a number of roller groups; and again heated up to 150° C. and stretched at a magnification listed in Table 1 in the crossing direction using a tenter. The stretched film was further annealed at 160° C., cooled down to 60° C., and having the both edge portions slit off, to thereby produce a three-layered light reflector having a thickness listed in Table 1.

In Comparative Examples 1 and 2, the stack was extruded 6-fold only in the moving direction by properly adjusting the lip aperture of the die, to thereby obtain the uniaxially stretched film having a thickness listed in Table 1.

EXAMPLE 5

The stacked material is re-heated to 145° C., and stretched 5-fold in the moving direction effected by difference in the peripheral speeds of a number of roller groups.

A composition (C) containing a propylene homopolymer and a heavy calcium carbonate in the amounts shown in Table 1 was kneaded under fusion using two units of extrusion machine, and the fused material was then stacked within a co-extrusion die so that the composition (B) is stacked on both sides of the 5-fold stretched sheet. The obtained stack was heated to 160° C. and then stretched 7.5-fold in the crossing direction, to thereby obtain a light reflector having on both sides thereof protective films.

EXAMPLES 6 TO 8

A composition (A) containing a propylene homopolymer, a high-density polyethylene, a heavy calcium carbonate and titanium dioxide having an average grain size of 0.2 $\mu$m in the amounts listed in Table 1, and a composition (B) containing a propylene homopolymer, a heavy calcium carbonate and titanium dioxide having an average grain size of 0.2 $\mu$m in the amounts listed in Table 1 were separately kneaded at 250° C. under fusion using three units of extrusion machine, where two units for the composition (B). The fused materials were then sent to a single co-extrusion die, stacked within such die so that the composition (B) is stacked on both sides of the composition (A), extruded into a sheet form, and then cooled to approx. 60° C. to thereby obtain a stack.

TEST EXAMPLES

With regard to the individual light reflectors obtained in Examples 1 to 8 and Comparative Examples 1 and 2, the opacity, porosity and luminance were measured. Results of the measurements were summarized in Table 1.

The opacity was measured using a test instrument Model SM-5 (a product of Suga Test Instruments Co., Ltd.) according to JIS P-8142.

The porosity was calculated from the foregoing equation, where density and true density were previously measured according to JIS P-8118.

The luminance was measured as shown in FIG. 1, in which the light reflector 1 was set opposing to the white dot printed plane 2 of the acryl plate 3 (light guide plate), the light from the cold cathode lamp 5 (inverter unit, 12 V, 6 mA bulb current, product of Harison Electric Corporation) was introduced into the acryl plate 3, and the reflected light was detected using a luminance gauge 6 (Model LS110, a product of Minolta Co., Ltd.).

Results of these measurements were shown in Table 1.

TABLE 1

| | Constitution of light reflector | | | | | | | | | | | | | |
|---|---|---|---|---|---|---|---|---|---|---|---|---|---|---|
| | Biaxially stretched film | | | | | | | Provision of protective layer (C) | Stretching factor (-fold) | | | Thickness ($\mu$m) | | Evaluation of light reflector | | |
| | Base layer (A) Composition (wt %) | | | | Surface and back layers (B) Composition (wt %) | | | Volume ratio of filler (%) | | | | | Total thickness | Thickness of layers (B)/(A)/(B) or (C)/(B)/(A)/(B)/(C) | Opacity (%) | Porosity (%) | Luminance (cd/m²) |
| | PP1 | HDPE | CaCO₃ | TiO₂ | PP2 | CaCO₃ | TiO₂ | | | Area | Moving | Crossing | | | | | |
| Ex. 1 | 65 | 10 | (b) 25 | 0 | 70 | (b) 30 | 0 | 10.1 | no | 45 | 5 | 9 | 135 | 0.5/134/0.5 | 98 | 47 | 1250 |
| Ex. 2 | 65 | 10 | (a) 25 | 0 | 70 | (b) 30 | 0 | 10.1 | no | 45 | 5 | 9 | 135 | 0.5/134/0.5 | 99 | 47 | 1340 |
| Ex. 3 | 60 | 10 | (a) 30 | 0 | 97 | (b) 3 | 0 | 12.4 | no | 52.3 | 5.5 | 9.5 | 80 | 0.5/79/0.5 | 98 | 47 | 1300 |
| Ex. 4 | 75 | 10 | (b) 15 | 0 | 97 | (b) 3 | 0 | 5.5 | no | 32 | 4 | 8 | 120 | 1/118/1 | 99 | 36 | 1240 |
| Ex. 5 | 75 | 10 | (b) 15 | 0 | 97 | (b) 3 | 0 | 12.0 | yes | 37.5 | 5 | 7.5 | 200 | 40/1/118/1/40 | 96 | 31 | 1220 |
| Ex. 6 | 62 | 10 | (a) 25 | 3 | 70 | (a) 29.5 | 0.5 | 10.8 | no | 45 | 5 | 9 | 135 | 0.5/134/0.5 | 99 | 47 | 1360 |
| Ex. 7 | 62 | 10 | (c) 25 | 3 | 70 | (c) 29.5 | 0.5 | 11.2 | no | 45 | 5 | 9 | 135 | 0.5/134/0.5 | 99 | 47 | 1350 |
| Ex. 8 | 62 | 10 | (c) 25 | 3 | 70 | (b) 29.5 | 0.5 | 11.2 | no | 45 | 5 | 9 | 135 | 0.5/134/0.5 | 99 | 47 | 1340 |
| Comp. 1 | 60 | 10 | (b) 30 | 0 | 97 | (b) 3 | 0 | 10.3 | no | 6 | 6 | — | 80 | 8/64/8 | 76 | 15 | 900 |
| Comp. 2 | 65 | 10 | (b) 25 | 0 | 70 | (b) 30 | 0 | 10.3 | no | 6 | 6 | — | 135 | 7/121/7 | 93 | 17 | 1150 |

Protective layer composed of 55 wt % of PP2 and 45 wt % of CaCO³
PP1: propylene homopolymer, MFR = 0.8 g/10 min (230° C., 2.16 kg load), (product of Nihon Polychem Co., Ltd.)
PP2: propylene homopolymer, MFR = 4 g/10 min (230° C., 2.16 kg load), (product of Nihon Polychem Co., Ltd.)
HDPE: high-density polyethylene (HJ381P, product of Nihon Polychem Co., Ltd.)
Types of CaCO₃
(a): heavy calcium carbonate, average grain size = 0.89 $\mu$m, specific surface area = 25,000 cm²/g, excluding grains with a grain size of 5 $\mu$m or above
(b): heavy calcium carbonate, average grain size = 1.8 $\mu$m, specific surface area = 12,500 cm²/g,
(c): heavy calcium carbonate, average grain size = 0.97 $\mu$m, specific surface area = 23,000 cm²/g, excluding grains with a grain size of 7 $\mu$m or above
TiO₂: titanium dioxide, average grain size = 0.2 $\mu$m.

As is clear from the above, the light reflector of the present invention can improve the luminance at low cost without relying upon components having optical properties. Using the light reflector of the present invention will thus successfully provide a bright backlight type device with a luminance improved from that in the conventional device.

What is claimed is:

1. A light reflector comprising a biaxially stretched film comprising a polyolefinic resin and a filler, wherein said filler is an inorganic filler having an average grain size of 0.1 to 8 μm and/or an organic filler having a mean dispersion grain size of 1.0 to 8 μm, said biaxially stretched film has an area stretched factor of 25 to 80, and said light reflector has a luminance of 1,300 cd/m² or above, and wherein said inorganic filler comprises calcium carbonate grains having a specific surface area of 20,000 cm²/g or above and excluding those with a grain size of 10 μm or above.

2. The light reflector as claimed in claim 1, wherein a volume ratio of said filler to said biaxially stretched film is 3.0 to 35% by volume.

3. The light reflector as claimed in claim 1, wherein a ratio $L_{MD}/L_{CD}$, which is a ratio of stretching factor of said biaxially stretched film in the moving direction $L_{MD}$ to a stretching factor in the crossing direction $L_{CD}$, is 0.25 to 2.7.

4. The light reflector as claimed in claim 1 having a porosity calculated by the equation below is 15 to 60%:

$$\text{porosity } (\%) = \frac{\rho_0 - \rho}{\rho_0} \times 100$$

where, $\rho_0$ is the true density, and $\rho$ is the density of said biaxially stretched film.

5. The light reflector as claimed in claim 1 having an opacity measured according to JIS (Japanese Industrial Standard) P-8138 of 90% or above.

6. The light reflector as claimed in claim 1, wherein said biaxially stretched film has a multi-layered structure.

7. The light reflector as claimed in claim 1, wherein said biaxially stretched film has a protective film on the front surface and/or back surface thereof.

* * * * *